July 14, 1925.                                                      1,546,230
                        H. R. GROVER ET AL
                    SANITARY MILKING PAIL COVER
                    Filed Nov. 10, 1924        2 Sheets-Sheet 1
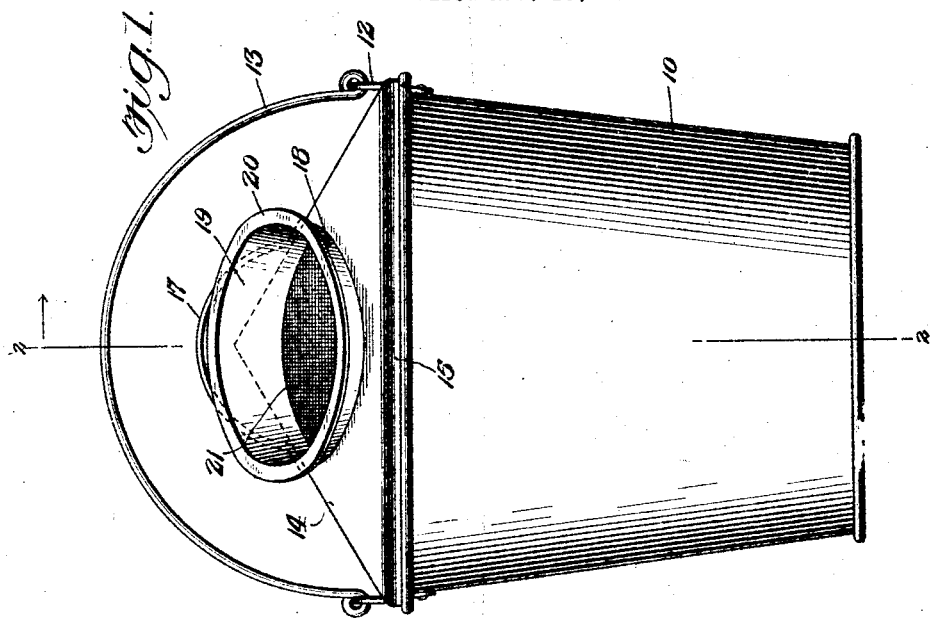
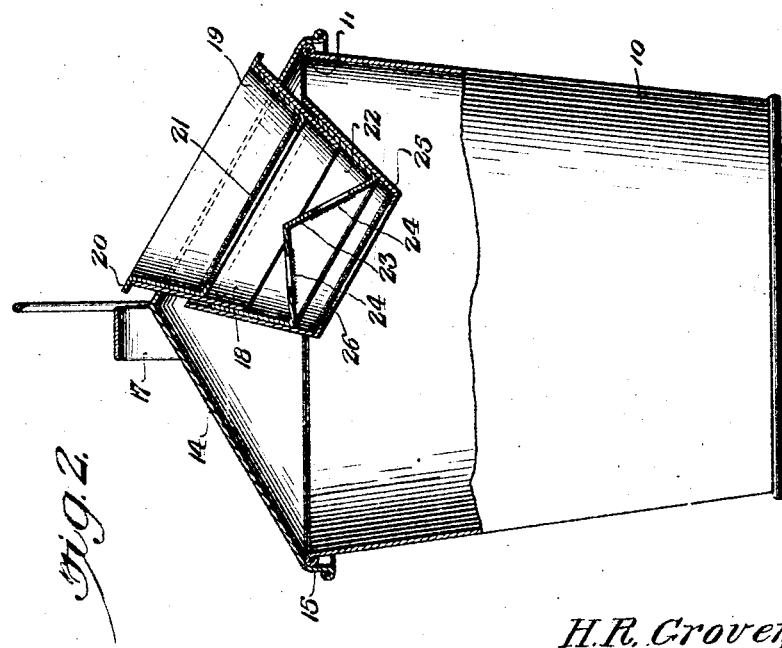
Inventors
H. R. Grover,
W. J. Grover,
By Mawhinney & Mawhinney
Attorneys

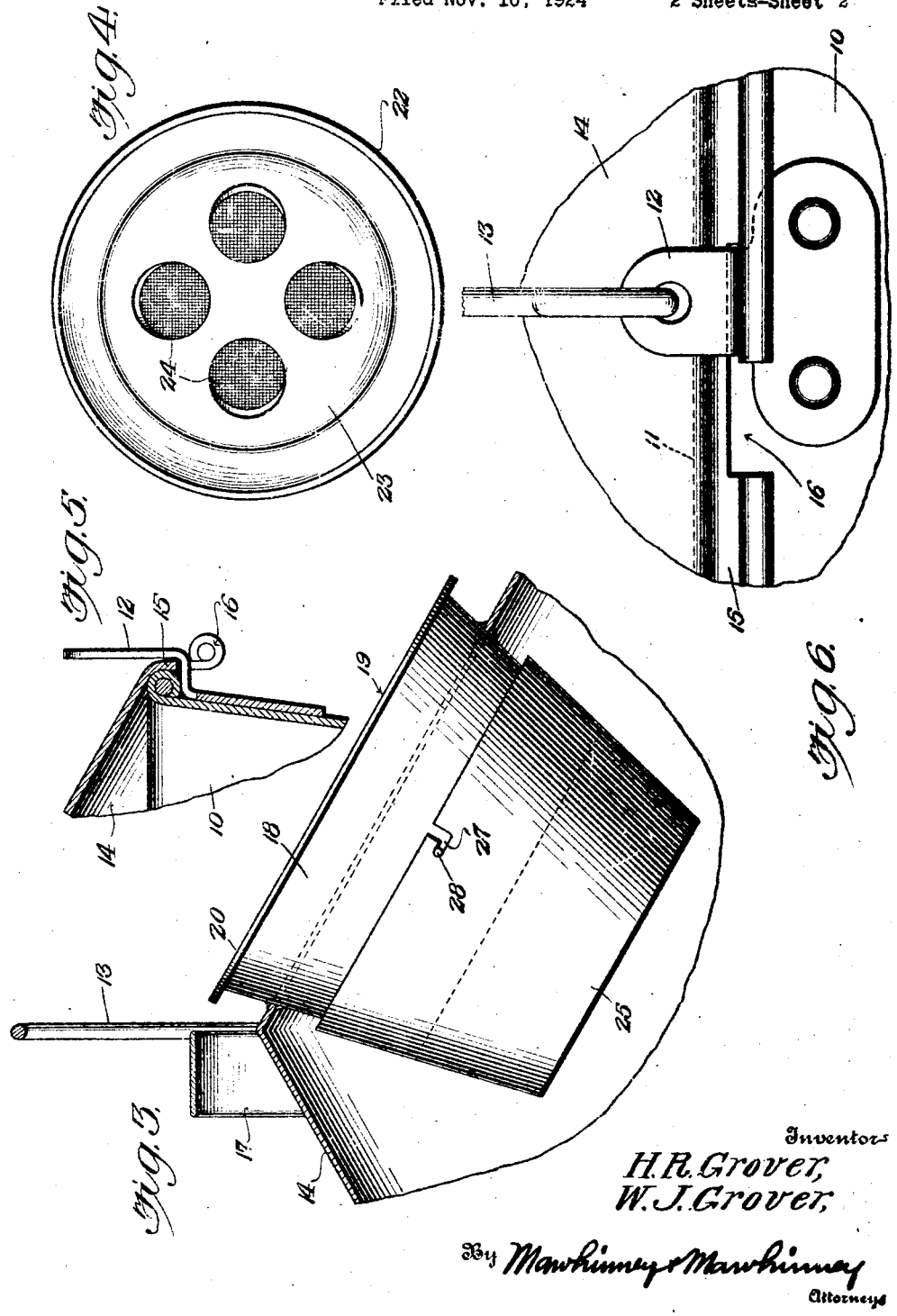

Patented July 14, 1925.

1,546,230

UNITED STATES PATENT OFFICE.

HENRY R. GROVER AND WILFERD J. GROVER, OF McHENRY, ILLINOIS.

SANITARY MILKING-PAIL COVER.

Application filed November 10, 1924. Serial No. 748,942.

*To all whom it may concern:*

Be it known that HENRY R. GROVER and WILFERD J. GROVER, both citizens of the United States, residing at McHenry, in the county of McHenry and State of Illinois, have invented certain new and useful Improvements in Sanitary Milking-Pail Covers, of which the following is a specification.

The present invention relates to dairy devices, and more particularly to milking pails and the like.

An object of the present invention is to provide a cover which may be easily applied to the standard milking pail and which is adapted to not only protect the milk in the pail, but to also strain or filter the milk as it enters the pail, so as to exclude and separate out of the milk all foreign matter which may be collected in the milk and from about the pail.

Among the objects of the present invention are to provide a cover which will prevent the spattering of the milk entering the pail, which when applied to the pail will not extend to any appreciable distance above it so that the pail may be handled and used in the ordinary manner, which has its screens or filters so arranged in the cover that they do not project to any appreciable distance into the pail and thus permit the use of the pail for a relatively large quantity of milk, to provide an attachment for a pail in the form of a cover which contains all of the necessary parts to enclose the pail and screen or filter the milk as it is delivered to the pail, and to provide a device of relatively few parts to which access may be easily gained for cleansing and the like.

A further object of the invention is to provide a milking pail cover with an inlet structure embodying screens and traps, so arranged that foreign matter carried in the milk will be trapped in such a manner that the milk itself will immediately pass from it so as to prevent the soaking of the foreign matter in the milk such as is frequently the case with present used devices, and to provide an arrangement whereby the milk immediately leaves the dirt or other foreign matter, so that the latter may be easily collected from the traps and screens from time to time.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a milking pail cover constructed according to the present invention and as applied to the standard pail.

Figure 2 is a vertical section taken through the same substantially on the line 2—2 of Figure 1.

Figure 3 is an enlarged fragmentary view through a portion of the cover showing the improved inlet in side elevation.

Figure 4 is a detail top plan view of the conical trap member used showing the arrangement of the spaced screens in the conical bottom.

Figure 5 is an enlarged vertical section taken through one edge of the cover and the pail, the section being taken adjacent to one of the ears of the pail, and Figure 6 is a fragmentary outer side elevation of the same.

Referring to the drawings 10 designates a pail of standard construction which is provided with the usual bead or rolled upper edge 11, upstanding ears 12 at opposite sides, and a bail or handle 13 of any approved type which is hinged upon the ears 12. This construction of pail 10 is of course by way of illustration only, as the improved cover may be modified within the limits of this invention to adapt it for application to receptacles of any desired size and configuration.

The cover comprises a substantially conical body 14 which is adapted to extend over the upper open end of the pail 10 and close it. The body 14 may be provided at its outer marginal edge with an annular depending flange 15 rolled or otherwise suitably reinforced at its edge and adapted to engage snugly over the bead 11 of the pail.

As shown in Figures 5 and 6 this depending flange 15 may be provided with bayonet slots 16 which are cut upwardly through its rolled edge and which extend circumferentially in one direction and to an extent sufficient to receive an adjacent ear 12, the ear 12 serving as a keeper or locking member with which the flange 15 may interlock. In this manner the cover 14 is held from accidental displacement from the top of the pail 10.

The body 14 of the cover is relatively low, so as not to project above the top of the pail 10 any further than is absolutely necessary for accommodating the improved inlet and to hold the latter from projecting down into the pail 10. The cover or body 14 is provided preferably at one side of its apex with a strap handle 17 of metal or the like which is adapted for use in positioning and removing the cover with respect to the pail. Within the opposite side of the cover 14 the improved inlet is positioned, the same comprising a fixed neck 18 of frusto-conical form soldered or otherwise suitably secured to the cover 14 for holding the neck 18 permanently in position. The neck 18 projects but slightly above the cover 14, a distance sufficient only to receive the upper part of a funnel piece 19 which is also of frusto-conical construction but which is provided at its outer edge with an outturned flange 20 adapted to engage and seat upon the outer end of the neck 18.

The funnel piece 19 is provided at its lower end with a screen or filter 21 secured entirely across the inner end of the funnel piece 19 and forming the first screen or filter of the inlet. The neck 18 carries a conical trap member 22 which is of cup shape having its outer wall flaring to substantially conform to the conical wall of the neck 18 and which is adapted to fit upon the inner end of the neck 18 and bind thereon as the cup 22 is forced upwardly on the neck. The conical bottom 23 projects inwardly into the cup and consequently rises into the neck 18 to a distance which is determined by the slip engagement of the trap member 22 upon the lower end of the neck. The conical trap member 22 is provided at spaced intervals in the conical bottom 23 with screens or filters 24 which are not only spaced apart from each other as shown in Figure 4, but which are also spaced from the marginal edge of the bottom 23 to form between the screens 24 and the wall of the member 22 traps or dams adapted to collect and retain foreign substances, particles and the like which may be carried through the screen 21 into the trap member.

A bottom screen 25 having a frusto-conical wall is fitted over the conical trap member 22 and is of greater height than the trap member and so proportioned as to provide an inner part which is spaced considerably from the bottom 23 to carry a screen bottom 26 forming the final screen or filter of the inlet.

This screen bottom 26 extends entirely across the inner end of the wall 25 so as to prevent the trapping of fluid within the final screen. The screen wall 25 projects upwardly beyond the conical trap member 22 and is provided in its upper edge as best seen in Figure 3 with a bayonet slot 27 adapted to engage a pin 28 projecting from the adjacent side of the neck 18. A bayonet slot 27 with its pin 28 may be arranged at opposite sides of the neck if desired for the purpose of holding the parts firmly together.

The outer wall 25 therefore serves not only to hold the final screen bottom 26 in place but also to hold the conical trap member 22 in position. It is necessary therefore to release the final trap only from the neck when it may be withdrawn together with the conical trap member. The funnel piece 19 may of course be lifted out of the top of the neck 18 at any time for the removal of sediment or the like collected upon the first screen 21.

It is apparent that the relatively few parts are closely nested together in one side of the cover 14, so that the parts do not project above or below the cover to any appreciable extent, and consequently the pail 10 having its cover applied thereto may be handled and used in the ordinary manner of using the open pail, and the inlet does not come in contact with the milk in the pail under ordinary conditions so that the pail may be well filled with milk and it is unnecessary to frequently empty the pail on account of the dipping of the inlet into the milk.

The bayonet slots 16 in the opposite sides of the cover flange 15 may be quickly interlocked with the ears 12 of the pail by a slight turning of the cover 14 on the pail after the cover is positioned. The ears 12 are therefore utilized for holding the cover from being knocked off of the pail should the pail be jarred or tilted over.

It is obvious that various changes and modifications may be made in the details of construction and design of the above specifically described embodiment of this invention without departing from the spirit thereof, such changes and modifications being restricted only by the scope of the following claims.

What is claimed is:—

1. A milking pail cover comprising a body portion adapted to engage over the upper end of the pail to close the same, an inwardly tapering neck carried by the cover in one side thereof, a funnel piece fitting in the top of the neck and having a screen in its bottom, a trap member fitting over the inner end of the neck at the inner side of the cover, and a second screen member engaging over said trap member and the inner end of said neck.

2. A milking pail cover comprising a body portion adapted to be placed upon the upper end of a pail for closing the same, a neck carried by the body portion and projecting therethrough, a funnel piece removably fitting in the outer end of the neck for receiving milk and having a screen bottom, a conical trap member removably fitting upon the inner end of the neck and having spaced screens in its bottom for filtering milk therethrough and providing traps between the screens, and a final screen member removably fitting over the conical trap member and upon the inner end of the neck for holding the trap member to the neck.

3. A cover for use upon the upper end of a milking pail comprising a relatively flat conical body portion having a marginal depending flange adapted to engage over the upper end of a milk pail, said flange having bayonet slots in opposite sides thereof for interlocking engagement with the ears of the milking pail, a neck carried through one side of the cover and tapering inwardly, a funnel piece removably fitting in the outer end of the neck and having a screen bottom, a conical trap member having an outwardly flaring wall adapted to bind upon the inner end of the neck and provided with spaced screens in its bottom and imperforate trap portions between the screens, a final screen member having an upwardly flaring wall adapted to bind over the conical trap member, and securing means carried by said neck and said final screen member for interlocking the final screen member on the neck and over said conical trap member.

In testimony whereof we affix our signatures.

HENRY R. GROVER.
WILFERD J. GROVER.